(12) United States Patent
Kim et al.

(10) Patent No.: US 9,298,044 B2
(45) Date of Patent: Mar. 29, 2016

(54) LIQUID CRYSTAL DISPLAY

(75) Inventors: Gwan-Soo Kim, Asan-si (KR); Chul Huh, Yongin-si (KR); Jin-Seuk Kim, Daejeon (KR); Sang-Hun Lee, Suwon-si (KR); Yui-Ku Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 195 days.

(21) Appl. No.: 12/900,797

(22) Filed: Oct. 8, 2010

(65) Prior Publication Data

US 2011/0222014 A1 Sep. 15, 2011

(30) Foreign Application Priority Data

Mar. 10, 2010 (KR) .......................... 10-2010-0021277

(51) Int. Cl.
| | |
|---|---|
| G02F 1/1339 | (2006.01) |
| G02F 1/13 | (2006.01) |
| G02F 1/1337 | (2006.01) |
| G02F 1/1362 | (2006.01) |
| G02F 1/1343 | (2006.01) |
| G09G 3/36 | (2006.01) |

(52) U.S. Cl.
CPC ........ *G02F 1/13394* (2013.01); *G02F 1/13624* (2013.01); *G02F 1/133707* (2013.01); *G02F 2001/13396* (2013.01); *G02F 2001/13398* (2013.01); *G02F 2001/134345* (2013.01); *G02F 2001/136222* (2013.01); *G09G 3/3659* (2013.01); *G09G 2300/0426* (2013.01); *G09G 2300/0447* (2013.01)

(58) Field of Classification Search
CPC ............ G02F 1/13392; G02F 1/13394; G02F 2001/13396; G02F 2001/13398
USPC .................................................. 349/155–156
See application file for complete search history.

(56) References Cited

U.S. PATENT DOCUMENTS

| | | | |
|---|---|---|---|
| 6,190,840 B1 | 2/2001 | Kawano et al. | |
| 6,633,348 B2 * | 10/2003 | Shohara et al. | 349/182 |
| 6,836,308 B2 * | 12/2004 | Sawasaki et al. | 349/156 |
| 7,576,826 B2 * | 8/2009 | Kim et al. | 349/155 |
| 8,134,652 B2 * | 3/2012 | Rho et al. | 349/155 |
| 8,580,352 B2 * | 11/2013 | Sung et al. | 345/173 |
| 2003/0103181 A1 * | 6/2003 | Imayama et al. | 349/122 |
| 2003/0214623 A1 * | 11/2003 | Ebisu et al. | 349/156 |
| 2004/0114087 A1 | 6/2004 | Cho et al. | |

(Continued)

FOREIGN PATENT DOCUMENTS

| | | |
|---|---|---|
| CN | 1497299 A | 5/2004 |
| CN | 101661201 A | 3/2010 |

(Continued)

*Primary Examiner* — Dung Nguyen
(74) *Attorney, Agent, or Firm* — Cantor Colburn LLP

(57) ABSTRACT

A liquid crystal display includes a first substrate and a second substrate facing each other, a first spacer and a second spacer on the first substrate and have different heights, and a liquid crystal layer between the first substrate and the second substrate and including a plurality of a liquid crystal molecule. The first spacer and the second spacer include a photosensitive material defining a maximum height of a spacer with respect to a predetermined a cross-section width dimension of the spacer, and heights less than the maximum height with respect to cross-section width dimensions larger than the predetermined cross-section width dimension. The first spacer and the second spacer can include a black pigment.

29 Claims, 10 Drawing Sheets

(56) References Cited

U.S. PATENT DOCUMENTS

| | | |
|---|---|---|
| 2004/0201815 A1* | 10/2004 | Yamamoto .................... 349/156 |
| 2005/0185129 A1 | 8/2005 | Kim et al. |
| 2010/0141875 A1* | 6/2010 | Shim et al. .................... 349/155 |

FOREIGN PATENT DOCUMENTS

| | | | |
|---|---|---|---|
| JP | 2001-091723 | A | 4/2001 |
| JP | 2001-100652 | A | 4/2001 |
| JP | 2002-162629 | A | 6/2002 |
| JP | 2003-121857 | A | 4/2003 |
| JP | 2006-039348 | A | 2/2006 |
| JP | 2006-039507 | A | 2/2006 |
| JP | 2006-084897 | A | 3/2006 |
| JP | 2006-309116 | A | 11/2006 |
| JP | 2007-086410 | A | 4/2007 |
| JP | 2007-094064 | A | 4/2007 |
| JP | 2008-046624 | A | 2/2008 |
| JP | 2008-175877 | | 7/2008 |
| JP | 2009-145882 | A | 7/2009 |
| JP | 2010-54809 | * | 3/2010 |
| KR | 10-0865622 | B1 | 10/2008 |

* cited by examiner

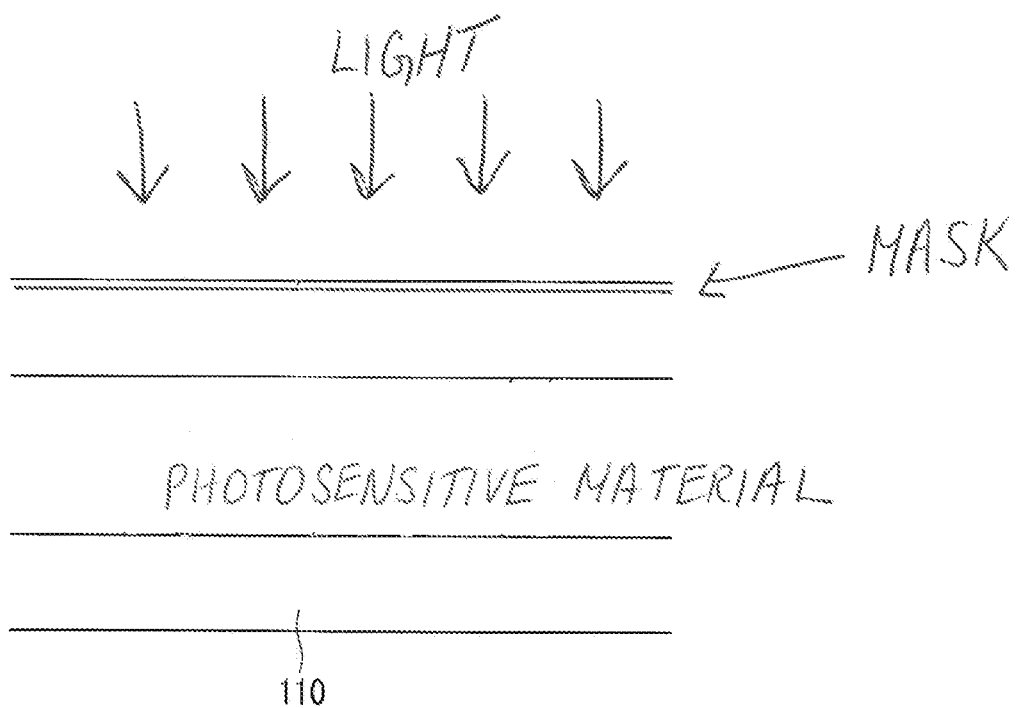

LIQUID CRYSTAL DISPLAY

This application claims priority to Korean Patent Application No. 10-2010-0021277 filed on Mar. 10, 2010, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

A liquid crystal display is one of the most widely used flat panel displays. The liquid crystal display includes two display panels on which electrodes are disposed, and a liquid crystal layer that is disposed therebetween, and controls the intensity of transmitted light by rearranging liquid crystal molecules of the liquid crystal layer, by applying the voltage to the electrodes.

Among the liquid crystal displays, the liquid crystal display that is mostly used is a structure in which field generating electrodes are provided in two display panels. The structure includes a plurality of thin film transistors and pixel electrodes arranged in a matrix form in one display panel (hereinafter, referred to as 'thin film transistor array panel'), color filters of red, green and blue are disposed in the other display panel (hereinafter, referred to as 'common electrode panel'), and a common electrode covers the entire surface thereof.

However, since the pixel electrode and the color filter are disposed on different display panels, it is difficult to form a precise alignment between the pixel electrode and the color filter, so that an alignment error may occur.

A structure (e.g., color filter on array, CoA) in which the color filter and the pixel electrode are disposed on the same display panel has been proposed. At this time, in general, in addition to the color filter, a light blocking member is disposed on the same display panel as the pixel electrode.

In order to constantly maintain a thickness of the liquid crystal layer of the liquid crystal display, a spacer is employed. The spacer includes a main spacer that controls the thickness of the liquid crystal cell of the liquid crystal display, and a plurality of subspacers that are disposed in a height that is lower than that of the main spacer, in order to prevent smear defects. The main spacer and the subspacer may maintain a cell gap at various external pressures by variously forming a step difference in heights thereof.

In order to form the main spacer and the subspacer that have a desired step, by using the same material and disposed in a same structural layer, the spacers having different cross-sections are formed. However, in general, considering a material used for the spacer, since a difference in step is not large according to the exposure amount of light, it is difficult to form a plurality of spacers having the desired step. In considering a control of the cross-section, in order to obtain the desired step, since the mask should be changed, the manufacturing cost is increased.

BRIEF SUMMARY OF THE INVENTION

The invention has been made in an effort to provide a liquid crystal display including a main spacer and a subspacer having a desired step without a change of a process mask.

An exemplary embodiment of a liquid crystal display includes a first substrate and a second substrate facing each other, a first spacer and a second spacer on the first substrate and having different heights, and a liquid crystal layer between the first substrate and the second substrate and including a plurality of a liquid crystal molecule. The first spacer and the second spacer include a photosensitive material defining a maximum height of a spacer with respect to a predetermined a cross-section width dimension of the spacer, and defining heights less than the maximum height with respect to cross-section width dimensions larger than predetermined cross-section width dimension.

The first spacer and the second spacer may include a black pigment.

The first spacer and the second spacer may include a same material.

A difference between the heights of the first spacer and the second spacer may be about 0.4 micrometer (µm) or more.

The liquid crystal display further includes a light blocking member on the first substrate, the first spacer and the second spacer including a same material as the light blocking member.

The spacer that has a larger height of the first spacer and the second spacer, has a cross-section width dimension of about 30 µm to about 35 µm.

The liquid crystal display further includes a third spacer on the first substrate and having a height that is different from the height of the first spacer and the second spacer. The third spacer includes the photosensitive material.

The photosensitive material has a positive photosensitivity.

The liquid crystal display further includes a pixel electrode on the first substrate, where the pixel electrode includes a plurality of a fine branched portion, and the liquid crystal molecule is linearly inclined according to a side of the fine branched portion.

In an exemplary embodiment of manufacturing a liquid crystal display, it is possible to form a main spacer and a subspacer having a desired step according to an exposure amount of light or a cross-section dimension, without a change in mask, by forming the main spacer and the subspacer of a photosensitive material that has a characteristic in which a maximum height is defined by the cross-section dimension of a spacer, and heights less than the maximum height are defined by an exposure amount of light or the cross-section width dimension.

BRIEF DESCRIPTION OF THE DRAWINGS

The above and other features of this disclosure will become more apparent by describing in further detail exemplary embodiments thereof with reference to the accompanying drawings, in which:

FIG. 8 is a cross-sectional view that illustrates exposing a photosensitive material to light.

DETAILED DESCRIPTION OF THE INVENTION

Figure 1:
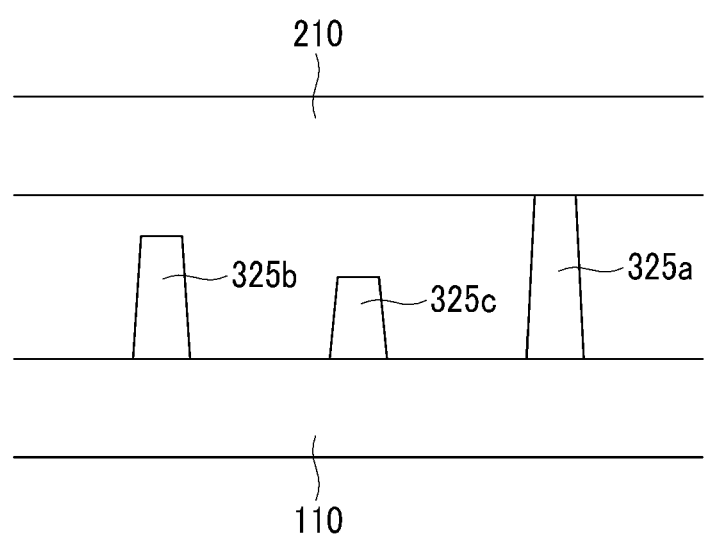
FIG. 1 is a cross-sectional view that schematically illustrates an exemplary embodiment a structure of a liquid crystal display, according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "beneath" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a liquid crystal display according to the invention will be described in brief with reference to FIG. 1.

FIG. 1 is a cross-sectional view that schematically illustrates an exemplary embodiment of a structure of a liquid crystal display, according to the invention.

As shown in FIG. 1, the liquid crystal display includes a first substrate 110 and a second substrate 210 that face each other, and a first spacer 325a, a second spacer 325b and a third spacer 325c disposed between the first and second substrates 110 and 210, and having different heights from each other. Heights of the spacers are taken perpendicular to a planar surface of the first substrate 110 or the second substrate 210.

The first spacer 325a having the largest height among the spacers, acts as a main spacer controlling an interval between the first and second substrates 110 and 210 that face each other. When the liquid crystal display is used, in the case of when a user presses a local portion of the substrates, the second spacer 325b and the third spacer 325c that have heights smaller than the first spacer 325a, support (e.g., contacts) two display panels of the liquid crystal display. The second spacer 325b and the third spacer 325c having the smaller heights act as a subspacer that reduce or effectively prevent smear defects generated by a damage of elasticity of the first spacer 325a by an external pressure.

The first spacer 325a, the second spacer 325b and the third spacer 325c of the liquid crystal display according to the invention may include a colored photosensitive material that includes a black pigment and the like. The colored photosensitive material may have positive photosensitivity, and be configured to have a largest (e.g., maximum) height according to a specific cross-section dimension, and then a reduced height according to cross-section dimensions greater than the specific cross-section dimension.

The first spacer 325a and the second spacer 325b may include the same material, and a difference between heights of the first spacer 325a and the second spacer 325b may be about 0.4 micrometer (μm) or more.

Figure 2A:
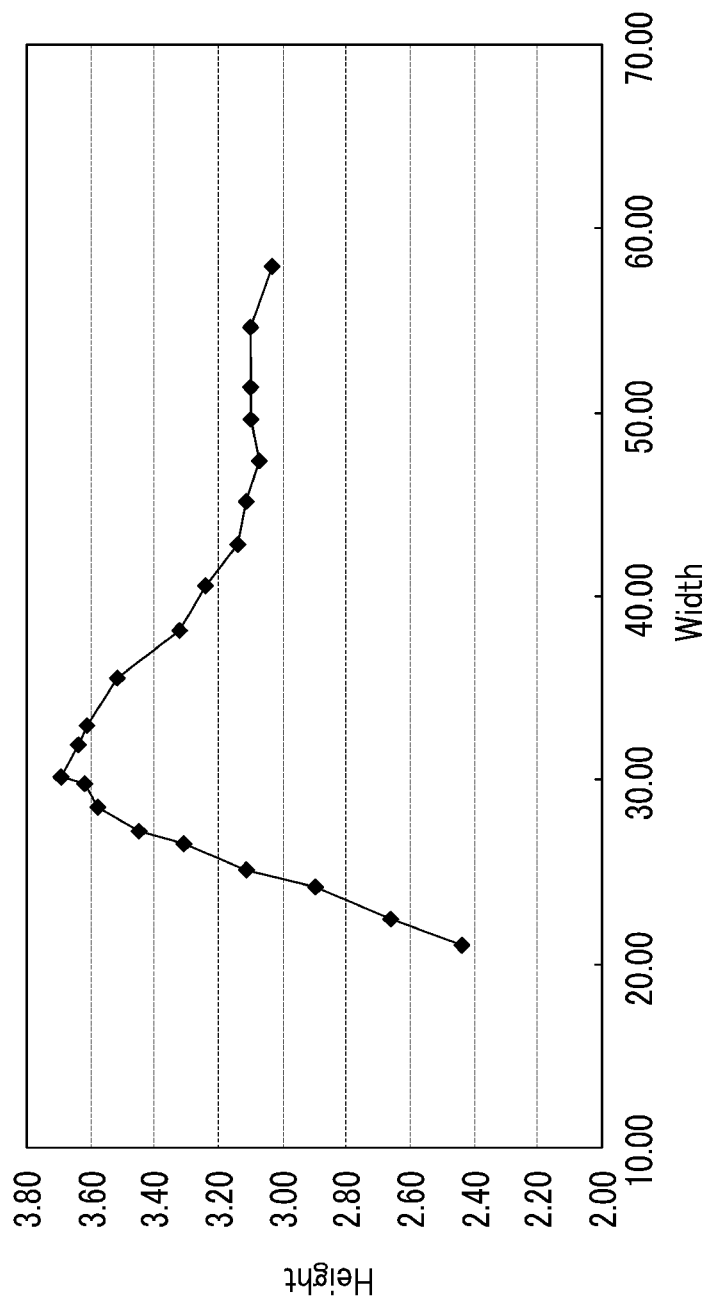
FIG. 2A is a graph that illustrates characteristics of an exemplary embodiment of a colored photosensitive material of a spacer of the liquid crystal display, according to the invention.
Figure 2B:
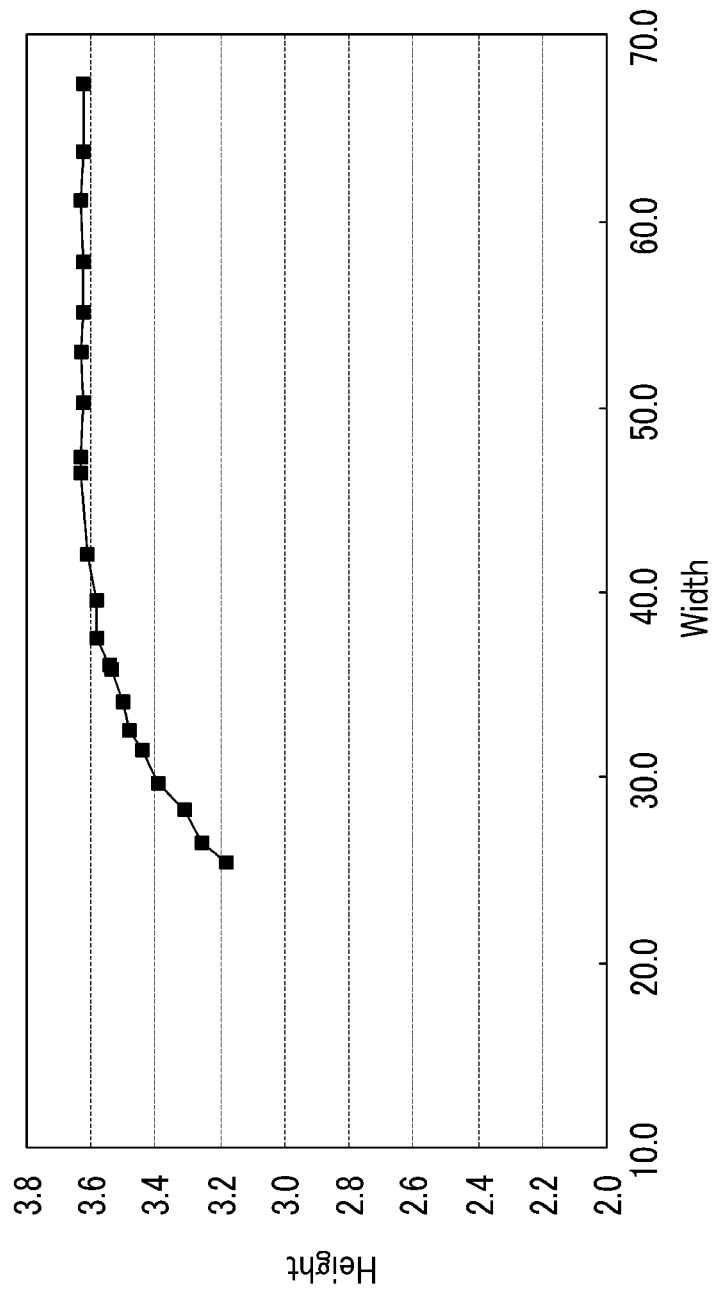
FIG. 2B is a graph that illustrates characteristics of a conventional photosensitive material that is generally used to form the spacer of a liquid crystal display.

With reference to FIG. 2A and FIG. 2B, characteristics of a colored photosensitive material of a spacer of a liquid crystal display according to the invention will be described.

FIG. 2A is a graph that illustrates characteristics of a colored photosensitive material of a spacer in a liquid crystal display, according to the invention, FIG. 2B is a graph that illustrates characteristics of a photosensitive material of a conventional spacer in a liquid crystal display, and FIG. 8 is a cross-sectional view that illustrates exposing a photosensitive material to light. In FIG. 2A and FIG. 2B, a horizontal axis displays a cross-section width of a lower surface of a spacer, and a vertical axis displays a height.

With reference to FIG. 2A, the height of the spacer including the colored photosensitive material of the spacer in the liquid crystal display according to the invention is increased, as the width of the lower surface is increased. When the width of the lower surface is about 30 μm to about 35 μm, the spacer has the largest (e.g., maximum) height. If the width of the lower surface is greater than about 35 μm, the height of the spacer decreases below the maximum height.

With reference to FIG. 2B, in the case of the spacer that includes the conventional photosensitive material that is generally used as the spacer of the liquid crystal display, as the width of the lower side of the spacer is increased, the height of the spacer is increased. If the width of the lower side of the spacer is higher than about 35 μm, a change of height of the spacer is negligible, and remains substantially constant.

In addition, as shown in FIG. 2A and FIG. 2B, as compared to the spacer that includes the conventional photosensitive material in the spacer of the liquid crystal display, it can be seen that a change of the height of the spacer including the colored photosensitive material in the spacer of the liquid crystal display of the invention is large according to the width of the lower side.

Therefore, when the spacer includes the conventional photosensitive material in the spacer of the liquid crystal display, since a change of height is not large according to the width of the lower side of the spacer, it is difficult to form a plurality of spacers including a step having a desired size. Even though the width of the lower side of the spacer is controlled with the conventional photosensitive material, a change of the step of the spacer may not be large. That is, even though the cross-section of the exposure portion of a mask used to form the spacer is changed, the step of the formed spacer is not large.

However, if the spacer includes the colored photosensitive material in the liquid crystal display according to the invention, since the change of the height is large according to the width of the lower side of the spacer, when the spacer is formed, it is easy to form a plurality of spacers having the desired step by controlling the cross-section. In addition, if the spacer includes the colored photosensitive material in the spacer of the liquid crystal display according to the invention, since the height is increased according to the width of the lower side of the spacer and lowered again if the width of the lower side is a predetermined value or more, in order to obtain the desired step, the number of cases controlling the width of the cross of the spacer may be variable. Thereby, in order to form a plurality of spacers having the desired step, it is possible to form a plurality of spacers having the desired step while an additional mask is not used but a known mask for forming a spacer is used.

Figure 3A:
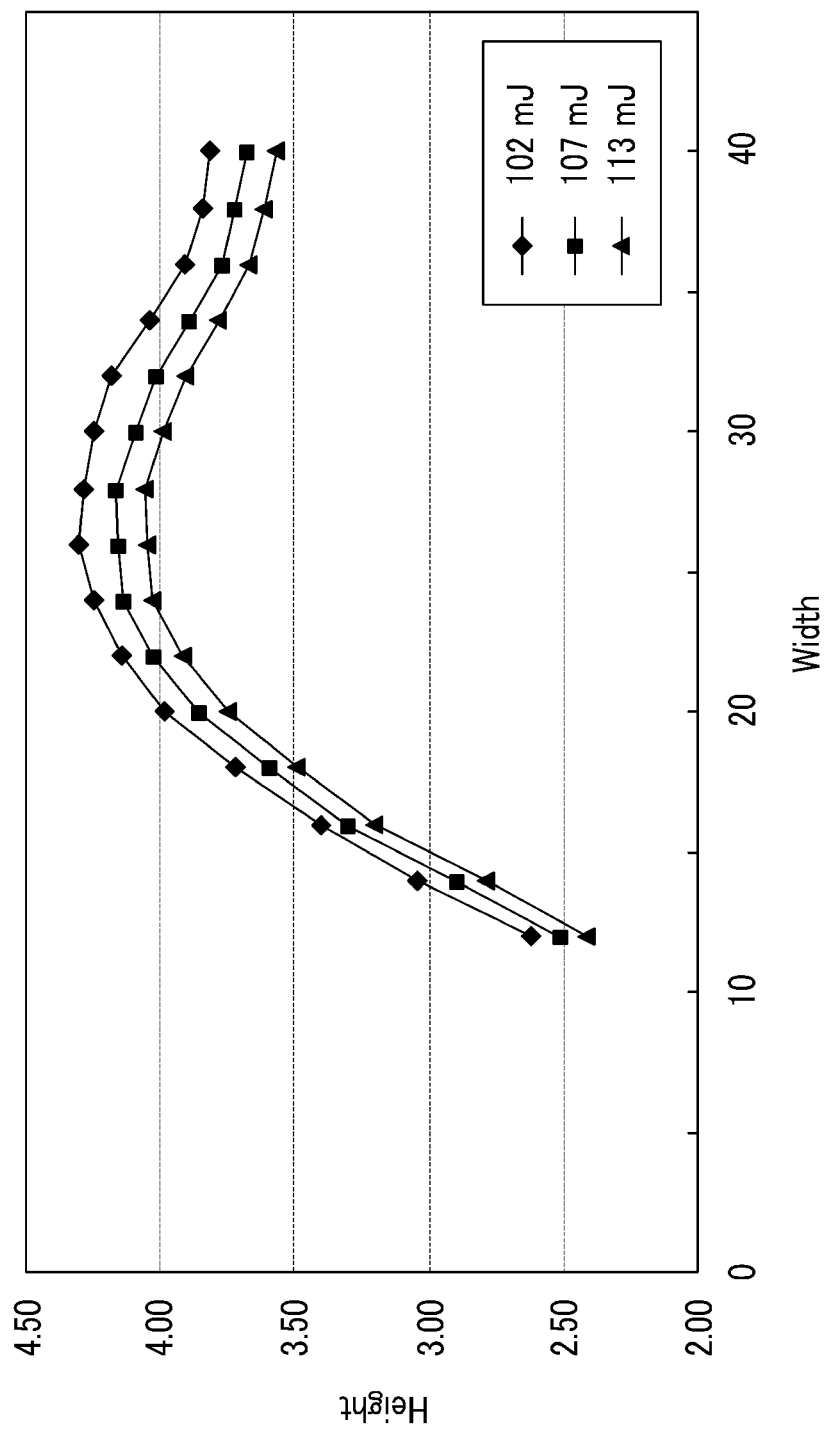
FIG. 3A is a graph that illustrates a height change according to the exposure amount of light to a colored photosensitive material of an exemplary embodiment of a spacer of a liquid crystal display, according to the invention.
Figure 3B:
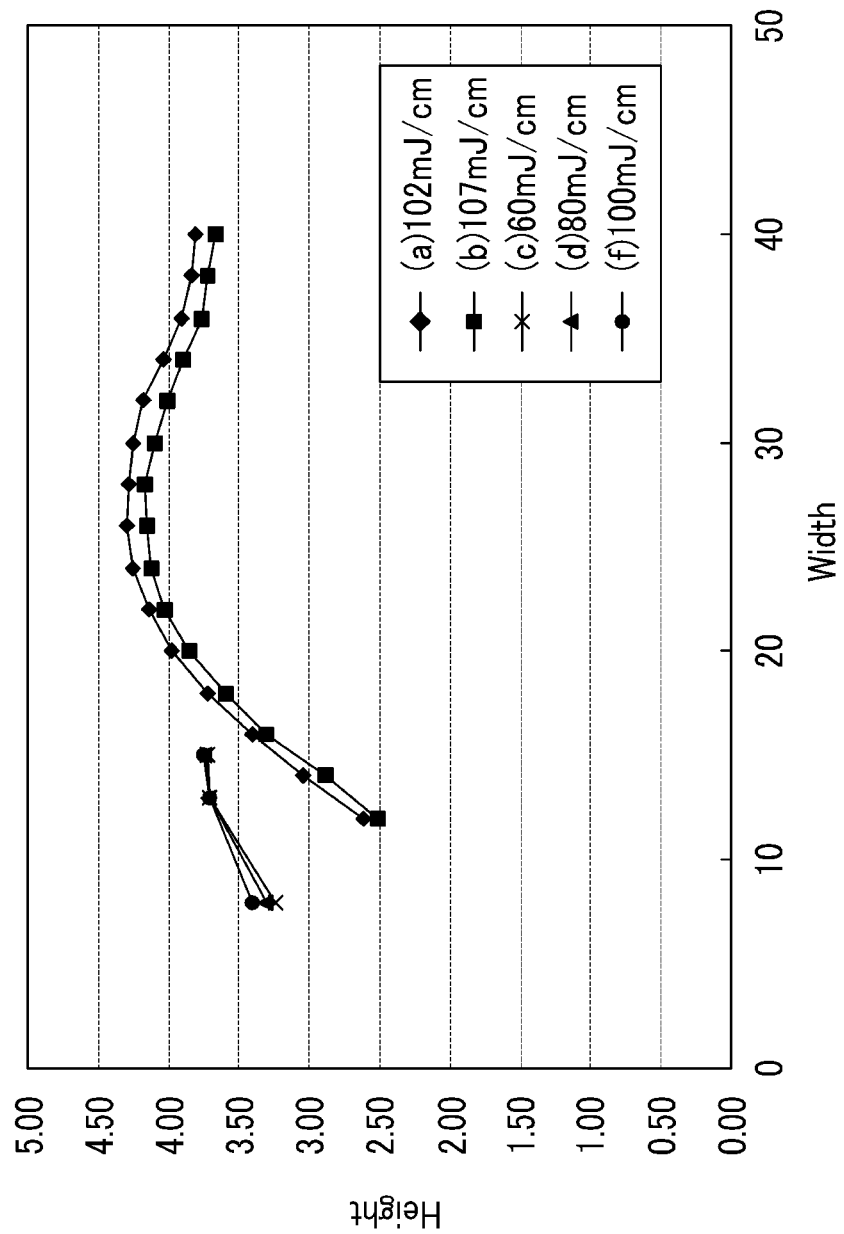
FIG. 3B is a graph that illustrates a height change according to the exposure amount of light to the photosensitive material of a conventional spacer of a liquid crystal display, and a colored photosensitive material of an exemplary embodiment of a spacer of a liquid crystal display, according to the invention.

With reference to FIG. 3A, FIG. 3B and FIG. 8, exposure characteristics of a colored photosensitive material of an exemplary embodiment a spacer in a liquid crystal display according to the invention will be described.

FIG. 3A is a graph that illustrates a height change according to the exposure amount of light of a colored photosensitive material of exemplary embodiments of a spacer in a liquid crystal display according to the invention, and FIG. 3B is a graph that illustrates a height change according to the exposure amount of light of a conventional photosensitive material of a spacer of a liquid crystal display, and the colored photosensitive material of an exemplary embodiment of a spacer in a liquid crystal display, according to an the invention.

In FIG. 3A and FIG. 3B, a horizontal axis displays a cross-section width of a lower surface of a spacer, and a vertical axis displays a height. In FIG. 3B, (a) (e.g. -♦-) and (b) (e.g. -■-) illustrate the case of a spacer formed by using the colored photosensitive material of a liquid crystal display according to the invention, and (c) (e.g. -x-), (d) (e.g. -▲-) and (e) (e.g., -●-) illustrate the case of when the spacer is formed by using the conventional photosensitive material that is generally used in order to form a spacer of a liquid crystal display.

With reference to FIG. 3A, in the case of when the spacer includes the colored photosensitive material in the liquid crystal display according to the invention, even though it has the same width of the lower side, the height of the spacer varies according to a light exposure amount. As illustrated in FIG. 3A, for example, as the exposure amount is increased from 102 millijoule per centimeter (mJ/cm) to 107 mJ/cm, that is, by 5 mJ/cm, at a same width of the lower side, the height has a difference of about 0.1 μm. Therefore, if the spacer is formed by using the colored photosensitive material of the liquid crystal display according to the invention, since the height of the spacer is lowered according to a change of exposure amount, a plurality of spacers that have a predetermined step can be formed by performing full exposure or half-tone exposure by using the same mask.

With reference to FIG. 3B, in the case of when the spacer includes the colored photosensitive material in the liquid crystal display according to the invention (a, b), the height of the spacer that has the same width of the lower side is changed according to a change of light exposure amount. In contrast, in the case of when the spacer includes the conventional photosensitive material that is generally used in order to form the spacer of a liquid crystal display (c, d, e), the height of the spacer is not changed according to the light exposure amount. Therefore, as compared to the case of when the spacer is formed by using the conventional photosensitive material in a liquid crystal display, the case of when the spacer is formed by using the colored photosensitive material in the liquid crystal display according to the invention, it can be seen that a plurality of spacers that have the desired step can be formed by using the same mask, because the exposure amount is changed.

In addition, since the colored photosensitive material of the spacer of the liquid crystal display according to the invention is not transparent, light can be blocked, so that it can be formed in conjunction with the light blocking member of the liquid crystal display.

Figure 4:
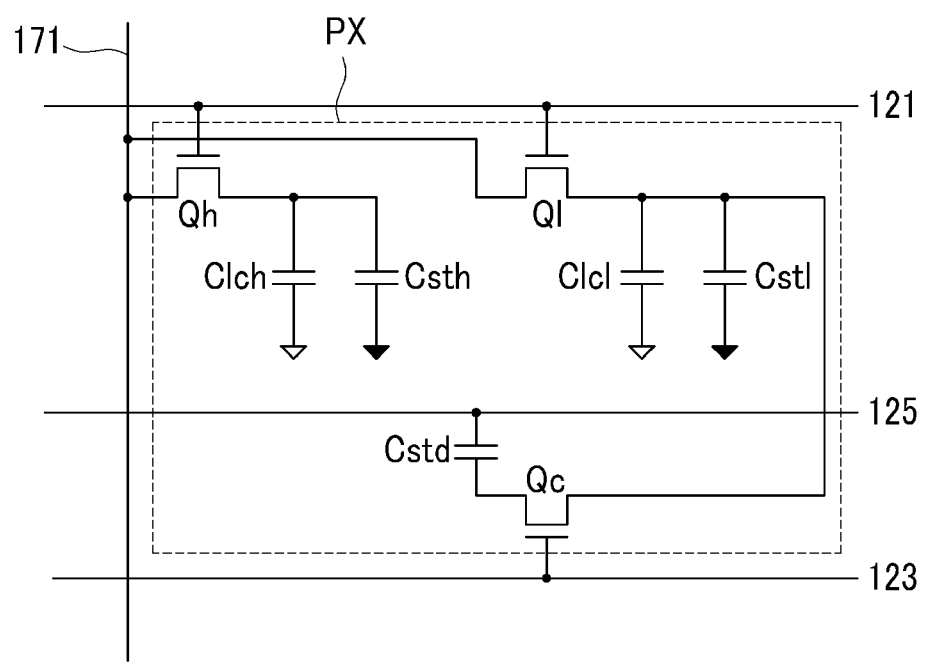
FIG. 4 is an equivalent circuit diagram illustrating an exemplary embodiment of one pixel of the liquid crystal display, according to the invention.
Figure 5:
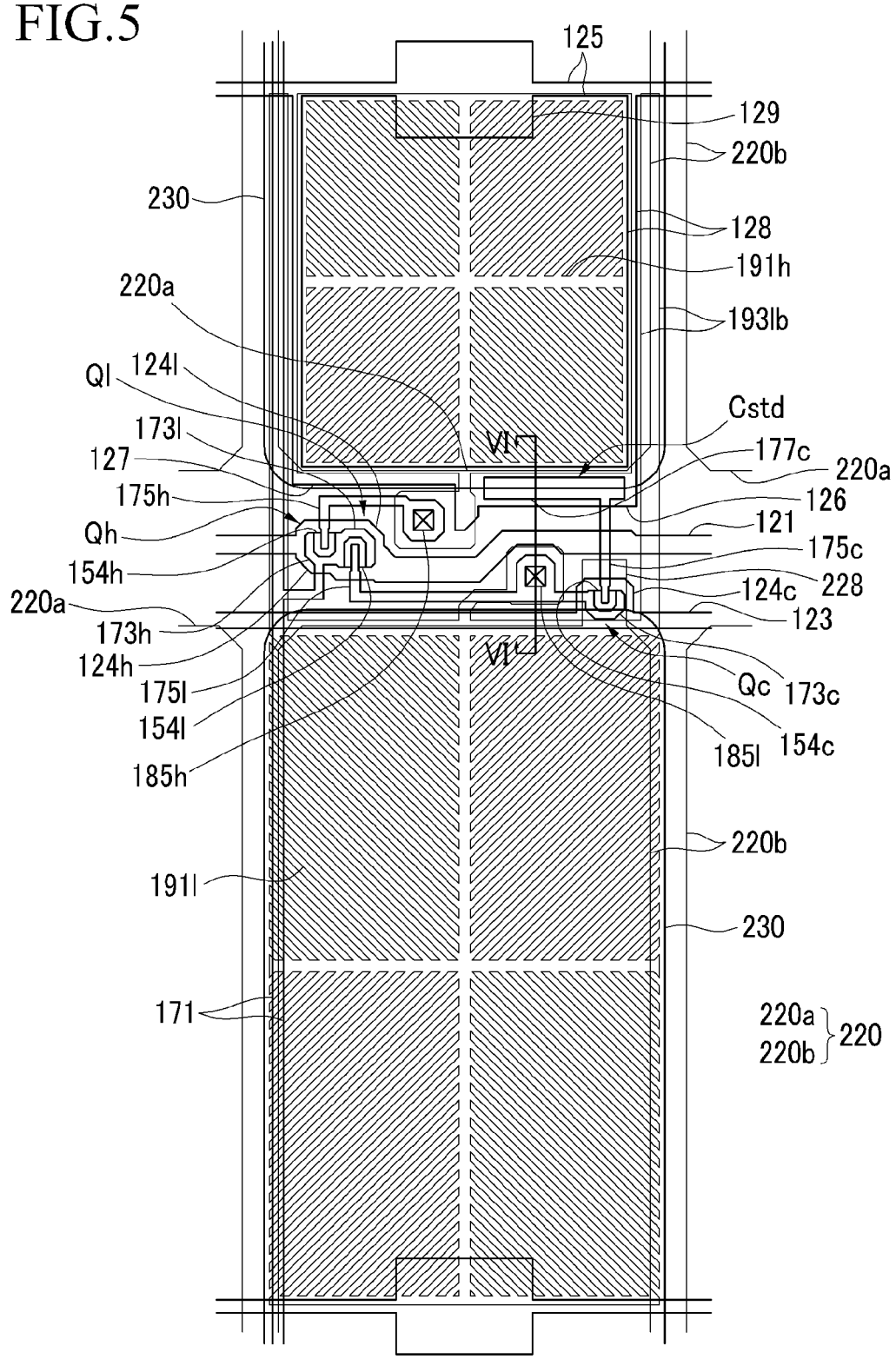
FIG. 5 is a plan view of an exemplary embodiment of a liquid crystal display, according to the invention.
Figure 6:
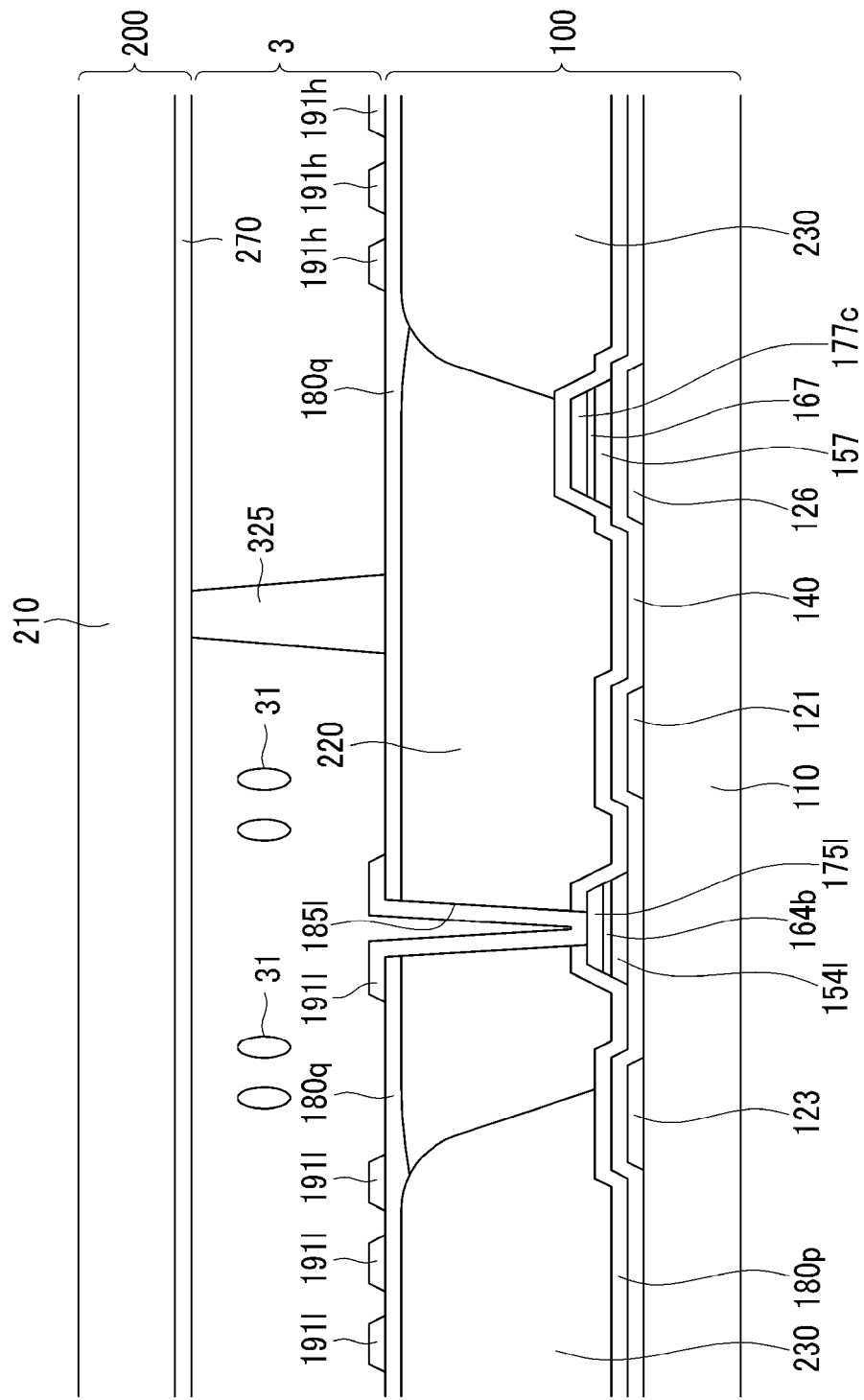
FIG. 6 is a cross-sectional view taken along line VI-VI of the liquid crystal display of FIG. 5.
Figure 7:
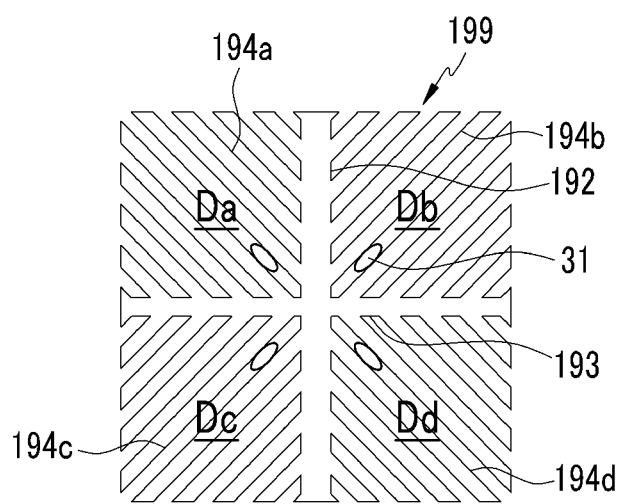
FIG. 7 is a plan view that illustrates an exemplary embodiment of a pixel electrode of the liquid crystal display of FIG. 5.

Hereinafter, an exemplary embodiment of a liquid crystal display, according to the invention will be described in detail with reference to FIG. 4 to FIG. 7. FIG. 4 is an equivalent circuit diagram illustrating an exemplary embodiment of one pixel of the liquid crystal display, according to the invention, FIG. 5 is a plan view of an exemplary embodiment of a liquid crystal display according to the invention, FIG. 6 is a cross-sectional view taken along VI-VI of the liquid crystal display of FIG. 5, and FIG. 7 is a plan view that illustrates a pixel electrode of the liquid crystal display of FIG. 3.

With reference to FIG. 4, the exemplary embodiment of the liquid crystal display according to the invention includes a signal line that includes a gate line 121, a storage electrode line 125, a voltage drop gate line 123 and data line 171, and a pixel PX that is connected thereto.

The pixel PX includes first, second and third switching elements Qh, Ql, and Qc, first and the second liquid crystal capacitors Clch and Clcl, first and the second storage capacitors Csth and Cstl, and voltage drop capacitor Cstd. Herein, the first switching element Qh and the first thin film transistor Qh, the second switching element Ql and the second thin film transistor Ql and the third switching element Qc and the third thin film transistor Qc are displayed by the same sign.

The first and the second switching elements Qh and Ql are connected to the gate line 121 and data line 171, respectively, and the third switching element Qc is connected to the voltage drop gate line 123.

The first and the second switching elements Qh and Ql are a three terminal element such as a thin film transistor that is provided in a lower display panel 100. The control terminal of the first and the second switching elements Qh and Ql is connected to the gate line 121, the input terminal is connected to the data line 171, and the output terminal is connected to the first and the second liquid crystal capacitors Clch and Clcl and the first and the second storage capacitors Csth and Cstl.

The third switching element Qc is a three terminal element such as a thin film transistor that is provided in the lower display panel 100. The control terminal of the third switching element Qc is connected to the voltage drop gate line 123, the input terminal is connected to the second liquid crystal capacitor Clcl, and the output terminal is connected to the voltage drop capacitor Cstd.

Referring to FIGS. 4 and 5, the first and the second liquid crystal capacitors Clch and Clcl are formed by overlapping first and second sub-pixel electrodes 191h and 191l connected to the first and the second switching elements Qh and Ql, respectively, with a common electrode 270 of an upper display panel 200. The first and the second storage capacitors Csth and Cstl are formed by overlapping a storage electrode 129, a storage electrode line 125, and the first and the second sub-pixel electrodes 191h and 191l.

The voltage drop capacitor Cstd is connected to the output terminal of the third switching element Qc and the storage electrode line 125, and is formed by overlapping the storage electrode line 125 provided in the lower display panel 100 with the output terminal of the third switching element Qc, with an insulator therebetween.

Now, with reference to FIG. 5 to FIG. 7, the liquid crystal display that is shown in FIG. 4 will be described in detail. In one exemplary embodiment, FIG. 5 illustrates what may be hereinafter referred to as a single pixel, a single pixel region or a single pixel area, which may be defined as an independent area unit capable of independently controlling liquid crystal in a liquid crystal display. The liquid crystal display includes the lower display panel 100 and the upper display panel 200, a liquid crystal layer 3 that is disposed between two display panels 100 and 200, and a pair of polarizers (not shown) that are attached to the outermost sides of the display panels 100 and 200.

First, the lower display panel 100 will be described.

A plurality of gate conductors that include a plurality of the gate line 121, a plurality of the voltage drop gate line 123 and a plurality of the storage electrode line 125 are disposed on an insulation substrate 110.

The gate line 121 and voltage drop gate line 123 longitudinally extend in a horizontal (e.g., transverse) direction of the pixel area in the plan view, and transfer a gate signal. The gate line 121 includes a first gate electrode 124h and a second gate electrode 124l that protrude upward and downward from a main portion of the gate line 121, in the plan view. The voltage drop gate line 123 includes a third gate electrode 124c that protrudes upward from a main portion of the voltage drop gate line 123, in the plan view. The first gate electrode 124h and the second gate electrode 124l are physically and electrically connected to each other to form one single unitary indivisible protrusion portion.

The storage electrode line 125 longitudinally extends in the horizontal direction, and transfers a predetermined voltage such as a common voltage Vcom. The storage electrode line 125 includes the storage electrode 129 that protrudes upward and downward from a main portion of the storage electrode line 125, a pair of vertical portions 128 that vertically extend downward with respect to the main portion of the storage electrode line 125, and a horizontal portion 127 that connects ends of the pair of vertical portions 128 to each other. The horizontal portion 127 includes a capacitive electrode 126. The main portion, the pair of vertical portions 128, the horizontal portion 127 and the capacitive electrode 126 form a single unitary indivisible member.

On the gate conductors 121, 123, and 125, a gate insulating layer 140 is disposed on substantially an entire of the lower display panel 100.

On the gate insulating layer 140, a plurality of semiconductor stripes including amorphous silicon, polysilicon or the like is disposed. The semiconductor stripe longitudinally extends in a vertical (e.g., longitudinal) direction of the pixel area. The semiconductor stripe includes first and the second semiconductors 154h and 154l that extend toward the first and the second gate electrodes 124h and 124l in the plan view and are connected to each other, and the third semiconductor 154c that is connected to the second semiconductor 154l. The third semiconductor 154c extends to form a fourth semiconductor 157.

On the semiconductor stripe, a plurality of ohmic contact stripes (not shown) are disposed, a first ohmic contact island (not shown) is disposed on the first semiconductor 154h, and a second ohmic contact island 164b and a third ohmic contact island (not shown) are formed on the second semiconductor 154l and the third semiconductor 154c, respectively. The ohmic contact stripe includes a first protrusion portion (not shown) that forms a pair in conjunction with the first ohmic contact island and is disposed on the first protrusion portion of the semiconductor stripe, a first protrusion portion (not shown) that forms a pair in conjunction with the second ohmic contact island 164b and is disposed on the second protrusion portion of the semiconductor stripe, and a third protrusion portion (not shown) that forms a pair in conjunction with the third ohmic contact island and is disposed on the third protrusion portion of the semiconductor stripe. The third ohmic contact island extends to form a fourth ohmic contact 167.

On the ohmic contacts 164l and 167, a data conductor that includes a plurality of a data line 171, a plurality of a first drain electrode 175h, a plurality of a second drain electrode 175l and a plurality of a third drain electrode 175c is disposed.

The data line 171 transports a data signal and longitudinally extends in a vertical direction, and crosses the gate line 121 and voltage drop gate line 123. Each data line 171 includes a first source electrode 173h and a second source electrode 173l that extend toward the first gate electrode 124h and the second gate electrode 124l in the plan view of the pixel area, and form a W-shape.

The first drain electrode 175h, the second drain electrode 175l and the third drain electrode 175c include a first wide end portion and a second rod-shaped end portion, in the plan view. A portion of the rod-shaped end portions of the first drain electrode 175h and the second drain electrode 175l is surrounded by the first source electrode 173h and the second source electrode 173l. The wide end portion of the second drain electrode 175l extends to form a U-shaped third source electrode 173c. The wide end 177c of the third drain electrode 175c is overlapped with the capacitive electrode 126 to form the voltage drop capacitor Cstd, and the rod-shaped end is partially surrounded by the third source electrode 173c.

The first, second, and third gate electrodes 124h, 124l, and 124c, the first, second, and third source electrodes 173h, 173l, and 173c, the first, second, and third drain electrodes 175h, 175l, and 175c and the semiconductor islands 154h, 154l, and 154c altogether form the first, second, and third thin film transistors Qh, Ql and Qc, respectively. A channel of the thin film transistor is with each of the semiconductors 154h, 154l, and 154c between each of the source electrodes 173h, 173l, and 173c, and each of the drain electrodes 175h, 175l, and 175c.

The semiconductor stripe that includes the semiconductors 154h, 154l, and 154c has a flat surface shape that is substantially same as the data conductors 171, 175h, 175l, and 175c and ohmic contacts therebeneath 164l and 167, with the exception of the channel region between the source electrodes 173h, 173l, and 173c and the drain electrodes 175h, 175l, and 175c. In the plan view, the semiconductor stripe has a substantially similar planar profile as the data conductors 171, 175h, 175l, and 175c and the ohmic contacts therebeneath 164l and 167. That is, in the semiconductor stripe that includes the semiconductors 154h, 154l, and 154c, there is a space between source electrodes 173h, 173l, and 173c and drain electrodes 175h, 175l, and 175c, and an exposed portion of the semiconductors 154h, 154l, and 154c that is not covered by the data conductors 171, 175h, 175l, and 175c.

A lower passivation layer 180p including an inorganic insulator such as silicon nitride or silicon oxide is disposed on the data conductors 171, 175h, 175l, 175c, and the exposed portion of the semiconductors 154h, 154l, and 154c.

A color filter 230 is disposed directly on the lower passivation layer 180p. The color filter 230 is disposed most regions with the exception of regions in which the first thin film transistor Qh, the second thin film transistor Ql and the third thin film transistor Qc are disposed. However, the color filter 230 may be substantially longitudinally extended in a vertical direction along a space between data lines 171 adjacent to each other, in the plan view. Each color filter 230 may display any one of three primary colors of red, green and blue colors.

On substantially an entire of the region in which the color filter 230 is not disposed and on a portion of the color filter 230, a light blocking member 220 is disposed overlapping. The light blocking member 220 may be called a black matrix and reduces or effectively prevents light leakage. The light blocking member 220 includes a first light blocking member 220a that extends parallel along the gate line 121 and voltage drop gate line 123, expands upward and downward in a longitudinal direction of the pixel area from the first light blocking member 220a, and includes a second light blocking member 220b that extends parallel along the data line 171. The first light blocking member 220a overlaps the region in which the first thin film transistor Qh, the second thin film transistor Ql and the third thin film transistor Qc are disposed, that is, where the color filter 230 is not disposed.

Referring to FIG. 6, on the light blocking member 220, a spacer 325 is disposed. Although not shown in FIGS. 5 and 6, the spacer 325 may include a plurality of spacers that have different heights, such as illustrated in FIG. 1. In addition, the spacer 325 may include a colored photosensitive material that includes a black pigment and the like. The colored photosensitive material may have a positive photosensitivity, and form a largest (e.g., maximum) height of the spacer according to a predetermined cross-section dimension, and form a reduced height of the spacer at a cross-section dimension larger than the predetermined cross-section dimension.

In addition, the spacer 325 may include a same material as the light blocking member 220. A height of the spacer 325 that is formed using the colored photosensitive material in the liquid crystal display according to the invention, is increased as the width of the lower surface is increased, up to a maximum height. In one exemplary embodiment, as illustrated in FIG. 2A, when the width of the lower surface of the spacer is about 25 µm to about 35 µm, the spacer has the largest height, and if the width of the lower surface of the spacer is higher than about 35 µm, the height thereof decreases from the maximum height.

On the color filter 230 and light blocking member 220, an upper passivation layer 180q is disposed. The upper passivation layer 180q prevents peeling of the color filter 230 and light blocking member 220, suppresses contamination of the liquid crystal layer 3 by the organic material in the solvent that inflows from the color filter 230, so that upper passivation layer 180q reduces or effectively prevents defects such as afterimages that may occur when an image is displayed in the liquid crystal display.

In the lower passivation layer 180p, the light blocking member 220 and the upper passivation layer 180q, a plurality of a first contact hole 185h and a plurality of a second contact hole 185l that expose the wide end portion of the first drain electrode 175h and the wide end portion of the second drain electrode 175l are disposed.

On the upper passivation layer 180q, a plurality of a pixel electrode 191 is disposed.

With reference to FIG. 6, each pixel electrode 191 includes the first sub-pixel electrode 191h and the second sub-pixel electrode 191l separated from each other with two gate lines 121 and 123 therebetween. The first sub-pixel electrode 191h and the second sub-pixel electrode 191l are disposed in an upper portion and a lower portion of the pixel area, relative to a center of the pixel area including the gate lines 121 and 123. The sub-pixel electrode 191h and the second sub-pixel electrode 191l are adjacent to and aligned with each other in a column direction of the pixel area The first sub-pixel electrode 191h and the second sub-pixel electrode 191l include one or more basic electrodes 199 or modifications thereof shown in FIG. 7.

Hereinafter, referring to FIG. 7, the basic electrode 199 will be described in detail.

As shown in FIG. 7, an overall entire shape of the basic electrode 199 is quadrangle, and it includes a cross-shaped stem portion formed of a transverse stem portion 193 and a vertical stem portion 192 that is vertical thereto. In addition, the basic electrode 199 is divided into a first subregion Da, a second subregion Db, a third subregion Dc and a fourth subregion Dd by the transverse stem portion 193 and the vertical stem portion 192. Each subregion Da-Dd includes a plurality of first to fourth fine branched portions 194a, 194b, 194c, and 194d.

The first fine branch portion 194a extends obliquely to an upper left direction from the transverse stem portion 193 or the vertical stem portion 192. and the second fine branch portion 194b extends obliquely to an upper right direction from the transverse stem portion 193 or the vertical stem portion 192. In addition, the third fine branch portion 194c extends obliquely to a lower left direction from the transverse stem portion 193 or the vertical stem portion 192, and the fourth fine branch portion 194d extends obliquely to a lower right direction from the transverse stem portion 193 or the vertical stem portion 192.

The first to fourth fine branch portions 194a, 194b, 194c, and 194d form an angle of approximately 45 degrees or 135 degrees with the gate lines 121, or the transverse stem portion 193. Further, the fine branch portions 194a, 194b, 194c, and 194d of the adjacent subregions Da, Db, Dc, and Dd may be orthogonal to each other.

Widths of the fine branched portions 194a, 194b, 194c, and 194d taken perpendicular to a longitudinal direction of the fine branched portions 194a, 194b, 194c, and 194d may be in the range of about 2.5 μm to about 5.0 μm, and a gap between adjacent fine branched portions 194a, 194b, 194c, and 194d in one subregion Da, Db, Dc, or Dd may be in the range of about 2.5 μm to 5.0 μm. The gap is taken perpendicular to edges of the fine branched portions 194a, 194b, 194c, and 194d In an alternative exemplary embodiment of the invention, the widths of the fine branched portions 194a, 194b, 194c, and 194d may increase in a direction towards the transverse stem portion 193 or the vertical stem portion 192 from a distal end of the fine branched portions 194a, 194b, 194c, and 194d. Further, a difference between the widest width portion and the narrowest width portion in one fine branched portion 194a, 194b, 194c, or 194d may be in the range of about 0.2 μm to 1.5 μm.

The first sub-pixel electrode 191h and/or the second sub-pixel electrode 191l include a circumference stem portion that effectively surrounds the circumference thereof. A vertical portion of the circumference stem portion extends parallel along the data line 171, and may reduce or effectively prevent capacitive coupling between the data line 171 and the first sub-pixel electrode 191h, and between the data line 171 and the second sub-pixel electrode 191l.

The first sub-pixel electrode 191h and the second sub-pixel electrode 191l receive a data voltage through the first contact hole 185h and the second contact hole 185l from the first drain electrode 175h and the second drain electrode 175l, respectively. The first sub-pixel electrode 191h and the second sub-pixel electrode 191l to which the data voltage is applied generates an electric field in conjunction with the common electrode 270 of the upper (e.g., common electrode) display panel 200 to determine a direction of a liquid crystal molecule 31 of the liquid crystal layer 3 between two the electrodes 191 and 270. As described above, according to the determined direction of he liquid crystal molecule 31, the luminance of light that passes through the liquid crystal layer 3 is changed.

Edges or sides of the first to the fourth fine branched portions 194a, 194b, 194c, and 194d distort an electric field to generate a horizontal component of the electric field that determines an inclination direction of the liquid crystal molecule 31. The horizontal components of the electric field are substantially horizontal (e.g., parallel) to the sides of the first to fourth fine branched portions 194a, 194b, 194c, and 194d. Therefore, as shown in FIG. 7, the liquid crystal molecule 31 is inclined in a direction that is parallel to a length direction of the fine branched portions 194a, 194b, 194c, and 194d.

Since one basic electrode 199 includes four subregions Da to Dd in which length directions of the fine branched portions 194a, 194b, 194c, and 194d are different from each other, the directions where the liquid crystal molecules 31 are inclined are in about four directions, and four domains where the alignment directions of the liquid crystal molecules 31 are different from each other are formed in the liquid crystal layer 3. As described above, by diversifying the inclination direction of the liquid crystal molecules, the standard viewing angle of the liquid crystal display is increased.

The first sub-pixel electrode 191h and the common electrode 270 form the first liquid crystal capacitor Clch in conjunction with the liquid crystal layer 3 therebetween, and the second sub-pixel electrode 191l and common electrode 270 form the second liquid crystal capacitor Clcl in conjunction with the liquid crystal layer 3 therebetween, so that the applied voltage is maintained even though the first and the second thin film transistors Qh and Ql are turned off.

The first and the second sub-pixel electrode 191h and 191l overlap the storage electrode 129 and the storage electrode line 125 to form the first and the second storage capacitors Csth and Cstl. The first and the second storage capacitors Csth and Cstl strengthen the voltage maintaining ability of the first and the second liquid crystal capacitors Clch and Clcl.

The capacitive electrode 126 and the extended (wide end) portion 177c of the third drain electrode 175c overlap with the gate insulating layer 140, and semiconductor layers 157 and 167 therebetween, to form the voltage drop capacitor Cstd. In another exemplary embodiment of the invention, the capacity electrode 126 and the extended portion 177c of the third drain electrode 175c that constitute the voltage drop capacitor Cstd may not be disposed overlapping the semiconductor layers 157 and 167.

On the pixel electrode 191 and exposed upper passivation layer 180q, a lower alignment layer (not shown) is disposed. The lower alignment layer may be a vertical alignment layer.

Next, the upper display panel 200 will be described.

The common electrode 270 is disposed on an insulation substrate 210. On the common electrode 270, an upper alignment layer (not shown) is disposed. The upper alignment layer may be a vertical alignment layer.

A polarizer (not shown) may be provided on an outer surface of each of the two display panels 100 and 200, and it is preferable that transmissive axes of two polarizers may be orthogonal to each other and any one transmissive axis of them is parallel to the gate line 121.

The liquid crystal layer 3 has a negative dielectric anisotropy, and the liquid crystal molecule 31 of the liquid crystal layer 3 may be aligned so that long axes thereof are vertical (e.g. perpendicular) with respects to the surface of two display panels 100 and 200, in a state in which there is no electric field. Therefore, the incident light does not pass through the crossed polarizers but is blocked in a state in which there is no electric field.

As described above, since the first sub-pixel electrode 191h and the second sub-pixel electrode 191l to which the data voltage is applied generates an electric field in conjunction with the common electrode 270 of the common electrode panel 200, the liquid crystal molecules 31 of the liquid crystal layer 3, which are aligned vertically with respect to the surface of two electrodes 191 and 270 in a state in which there is no electric field, are inclined to be substantially parallel with respect to planar surfaces of two electrodes 191 and 270, and the luminance of light that passes through the liquid crystal layer 3 is changed according to the degree of inclination of the liquid crystal molecule.

As described above, exemplary embodiments of the spacer of the liquid crystal display according to the invention, may include a colored photosensitive material that includes a black pigment and the like. The colored photosensitive material may have positive photosensitivity, and form a largest (e.g., maximum) height of the spacer according to a predetermined cross-section dimension, and form a reduced height of the spacer at a cross-section dimension larger than the predetermined cross-section dimension.

In addition, the spacer may include a same material as the light blocking member. The height of the spacer that is formed by the colored photosensitive material in the liquid crystal display according to the invention is increased as the width of the lower surface is increased up to the maximum height. In one exemplary embodiment, when the width of the lower surface of the spacer is about 25 μm to about 35 μm, it has the largest height, and if the width of the lower surface is higher than about 35 μm, the height thereof decreases from the maximum height.

The structure of the liquid crystal display as described above in FIGS. 4-7 is an exemplary of the liquid crystal display that includes a spacer for liquid crystal display, according to the invention. All characteristics of the exemplary embodiments of the spacer for liquid crystal display according to the invention shown in FIG. 1 to FIG. 3B, may be applied to all kinds of liquid crystal displays that include a spacer formed through a photolithography process.

A liquid crystal display structure including spacers having different heights may be manufactured by forming the spacers including a photosensitive material having a material characteristic defining a maximum height of a spacer with respect to a predetermined a cross-section width dimension of the spacer, and defining heights less than the maximum height with respect to cross-section width dimensions larger than the predetermined cross-section width dimension. The spacers at different heights is considered a distinct structural characteristic of a final liquid crystal display. Since the spacers at different heights is formed by the photosensitive material having the material characteristic during a manufacturing process, such process of forming the spacers using the photosensitive material is considered to impart the distinct structural characteristic of the final liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of forming a liquid crystal display, the method including:
    disposing a first substrate and a second substrate facing each other;
    forming each of a first spacer and a second spacer on the first substrate and from a photosensitive material to have different heights; and
    disposing a liquid crystal layer between the first and second substrates;
    wherein for predetermined cross-section widths of the first and second spacers, the forming the first and second spacers from the photosensitive material to have the different heights comprises:
        forming a layer of the photosensitive material to include photosensitive material layer portions having the predetermined cross-section widths on the first substrate; and
        exposing the photosensitive material layer portions having the predetermined cross-section widths to a single amount of light,
        wherein when the predetermined cross-section widths of the first and second spacers are different, the exposing the photosensitive material layer portions having the predetermined cross-section widths to the same single amount of light forms the different height first and second spacers.

2. A liquid crystal display formed by the method of claim 1, and comprising:
    the first substrate and the second substrate facing each other;
    the first spacer and the second spacer on the first substrate, and having the different heights; and
    the liquid crystal layer between the first substrate and the second substrate, and including a plurality of a liquid crystal molecule.

3. The liquid crystal display of claim 2, wherein:
    the first spacer and the second spacer include a black pigment.

4. The liquid crystal display of claim 3, wherein:
    a difference between the heights of the first spacer and the second spacer is about 0.4 micrometer or more.

5. The liquid crystal display of claim 4, further comprising:
    a light blocking member on the first substrate,
    wherein the first spacer and the second spacer include a same material as the light blocking member.

6. The liquid crystal display of claim 5, wherein:
    the spacer which has a larger height of the first spacer and the second spacer, has a cross-section width dimension of about 30 micrometers to about 35 micrometers.

7. The liquid crystal display of claim 6, further comprising:
    a third spacer on the first substrate and having a height which is different from the height of the first spacer and the second spacer,
    wherein the third spacer includes the photosensitive material.

8. The liquid crystal display of claim 7, wherein:
    the photosensitive material has a positive photosensitivity.

9. The liquid crystal display of claim 2, wherein:
    a difference between the heights of the first spacer and the second spacer is about 0.4 micrometer or more.

10. The liquid crystal display of claim 9, further comprising:
    a light blocking member on the first substrate,
    wherein the first spacer and the second spacer include a same material as the light blocking member.

11. The liquid crystal display of claim 10, wherein:
    the spacer which has a larger height of the first spacer and the second spacer, has a cross-section width dimension of about 30 micrometers to about 35 micrometers.

12. The liquid crystal display of claim 11, further comprising:
    a third spacer on the first substrate and having a height which is different from the height of the first spacer and the second spacer,
    wherein the third spacer includes the photosensitive material.

13. The liquid crystal display of claim 12, wherein:
    the photosensitive material has a positive photosensitivity.

14. The liquid crystal display of claim 9, wherein:
    the spacer which has a larger height of the first spacer and the second spacer, has a cross-section width dimension of about 30 micrometers to about 35 micrometers.

15. The liquid crystal display of claim 14, further comprising:
    a third spacer on the first substrate and having a height which is different from the height of the first spacer and the second spacer,
    wherein the third spacer includes the photosensitive material.

16. The liquid crystal display of claim 15, wherein:
    the photosensitive material has a positive photosensitivity.

17. The liquid crystal display of claim 2, wherein:
a difference between the heights of the first spacer and the second spacer is about 0.4 micrometer or more.

18. The liquid crystal display of claim 17, wherein:
the spacer which has a larger height of the first spacer and the second spacer, has a cross-section width dimension of about 30 micrometers to about 35 micrometers.

19. The liquid crystal display of claim 18, further comprising:
a third spacer on the first substrate and having a height which is different from the height of the first spacer and the second spacer,
wherein the third spacer includes the photosensitive material.

20. The liquid crystal display of claim 19, wherein:
the photosensitive material has a positive photosensitivity.

21. The liquid crystal display of claim 2, further comprising:
a light blocking member on the first substrate,
wherein the first spacer and the second spacer include a same material as the light blocking member.

22. The liquid crystal display of claim 21, wherein:
the spacer which has a larger height of the first spacer and the second spacer, has a cross-section width dimension of about 30 micrometers to about 35 micrometers.

23. The liquid crystal display of claim 22, further comprising:
a third spacer on the first substrate and having a height which is different from the height of the first spacer and the second spacer,
wherein the third spacer includes the photosensitive material.

24. The liquid crystal display of claim 22, wherein:
the photosensitive material has a positive photosensitivity.

25. The liquid crystal display of claim 2, further comprising:
a third spacer on the first substrate and having a height which is different from the height of the first spacer and the second spacer,
wherein the third spacer includes the photosensitive material.

26. The liquid crystal display of claim 25, wherein:
the photosensitive material has a positive photosensitivity.

27. The liquid crystal display of claim 2, wherein:
the photosensitive material has a positive photosensitivity.

28. The method of claim 1, wherein when the predetermined cross-section widths of the first and second spacers are the same, the exposing the photosensitive material layer portions having the predetermined cross-section widths to single amounts of light different from each other forms the different height first and second spacers.

29. The method of claim 1, wherein the forming the first and second spacers having different heights further comprises using a same mask.

* * * * *